US012597297B2

(12) United States Patent
Kwon

(10) Patent No.: US 12,597,297 B2
(45) Date of Patent: Apr. 7, 2026

(54) VEHICLE CONTROL APPARATUS AND METHOD THEREFOR

(71) Applicants: Hyundai Motor Company, Seoul (KR); Kia Corporation, Seoul (KR)

(72) Inventor: Hae Yun Kwon, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 268 days.

(21) Appl. No.: 18/210,446

(22) Filed: Jun. 15, 2023

(65) Prior Publication Data

US 2024/0169769 A1      May 23, 2024

(30) Foreign Application Priority Data

Nov. 23, 2022    (KR) ........................ 10-2022-0158583

(51) Int. Cl.
| | |
|---|---|
| *G07C 5/00* | (2006.01) |
| *B60L 58/12* | (2019.01) |
| *B60R 25/31* | (2013.01) |
| *B60R 25/32* | (2013.01) |
| *H04L 12/40* | (2006.01) |

(52) U.S. Cl.
CPC .............. *G07C 5/008* (2013.01); *B60L 58/12* (2019.02); *B60R 25/31* (2013.01); *B60R 25/32* (2013.01); *H04L 12/40* (2013.01); *H04L 2012/40215* (2013.01); *H04L 2012/40273* (2013.01)

(58) Field of Classification Search
CPC ......... G07C 5/008; B60L 58/12; B60R 25/31; B60R 25/32; H04L 12/40; H04L 2012/40215; H04L 2012/40273
See application file for complete search history.

(56) References Cited

U.S. PATENT DOCUMENTS

| | | | | |
|---|---|---|---|---|
| 2019/0379218 A1* | 12/2019 | Varughese | ............ | B60R 16/033 |
| 2020/0114768 A1* | 4/2020 | Oestreich | ............ | G01R 31/382 |
| 2021/0114535 A1* | 4/2021 | Ye | ........................ | B60R 16/0232 |
| 2021/0184890 A1* | 6/2021 | Kim | .................. | H04L 12/40039 |
| 2023/0073436 A1* | 3/2023 | Kent | .................... | H04W 4/029 |

FOREIGN PATENT DOCUMENTS

| | | | | |
|---|---|---|---|---|
| IN | 202401022508 A | * | 3/2021 | |
| WO | WO-2011003813 A1 | * | 1/2011 | ............ H04L 12/12 |
| WO | WO-2016013373 A1 | * | 1/2016 | ............ B60R 16/02 |

OTHER PUBLICATIONS

Machine Translated WO-2016013373-A1 (Year: 2016).*
Machine Translated WO-2011003813-A1 (Year: 2011).*

* cited by examiner

*Primary Examiner* — Anne Marie Antonucci
*Assistant Examiner* — Misa H Nguyen
(74) *Attorney, Agent, or Firm* — Banner & Witcoff, Ltd.

(57) ABSTRACT

Disclosed is a vehicle control apparatus, method, and system. The vehicle control apparatus may include a communication control device that sets, based on a host vehicle satisfying a power-off condition, a sleep state non-entry detection time. The sleep state non-entry detection time may be based on a vehicle state of the host vehicle. The vehicle control apparatus may detect at least one controller, of a plurality of controllers of the host vehicle, that has not entered a sleep state after the sleep state non-entry detection time has elapsed, and transmit, to the power control device, information on the at least one controller. The power control device may, based on the information on the at least one controller, interrupt power for operation of the at least one controller.

20 Claims, 5 Drawing Sheets

VEHICLE CONTROL APPARATUS AND METHOD THEREFOR

CROSS-REFERENCE TO RELATED APPLICATION

This application claims the benefit of priority to Korean Patent Application No. 10-2022-0158583, filed in the Korean Intellectual Property Office on Nov. 23, 2022, the entire contents of which are incorporated herein by reference.

TECHNICAL FIELD

The present disclosure relates to a vehicle control apparatus and a method therefor, and more particularly, a technology for managing a sleep state of a vehicle.

BACKGROUND

Vehicles use various network protocols (e.g., controller area network (CAN), CAN flexible data rate (FD), local area network (LAN), Ethernet, etc.) to perform communication with various components.

In particular, CAN has been recognized as a communication network having verified reliability because CAN has excellent performance at competitive prices compared to other communication networks, and is successfully operated in harsh environments such as high temperatures, shocks, and vibrations.

In addition, CAN has the advantage of having flexibility to use a complex message method through a standard communication protocol and reducing wire work between pointers by using multi-channel communication.

However, in spite of these advantages, a vehicle battery discharge problem has emerged as a customer complaint because of at least one of a plurality of controllers in a vehicle not entering a sleep state due to the recently diversified vehicle environment.

Furthermore, to solve the above-described problem, a technique has been devised to cut off power to at least one controller when it is detected that at least one controller is in a communication state (as opposed to a sleep state) based on a specific network protocol over a network for a specific time period. However, this solution provides poor flexibility because a controller that has not entered a sleep state may be detected only during a fixed specific time zone, and this may cause some inconvenience in terms of usability because there is no consideration for user or vehicle states.

SUMMARY

The present disclosure has been made to solve the above-mentioned problems occurring in the prior art while advantages achieved by the prior art are maintained intact.

An aspect of the present disclosure provides a vehicle control apparatus and a vehicle control method which set a sleep state non-entry detection time based on a vehicle state of a host vehicle when it is identified that the host vehicle is in a power-off state, and adaptively detect at least one controller based on the set detection time.

An aspect of the present disclosure provides a vehicle control apparatus and method capable of optimizing subsequent network state monitoring operations by storing and updating a vehicle state at the time when a host vehicle has entered a power-off state or a vehicle state at the time when a controller that has not entered a sleep state within a set detection time among a plurality of controllers is detected.

An aspect of the present disclosure provides a vehicle control device and method for performing power control of more various controllers by monitoring not only communication between components based on the CAN protocol but also communication between components (e.g., at least one of a display device controller, an autonomous driving controller, an autonomous parking controller, and any combination thereof) based on LAN (or Ethernet).

The technical problems to be solved by the present disclosure are not limited to the aforementioned problems, and any other technical problems not mentioned herein will be clearly understood from the following description by those skilled in the art to which the present disclosure pertains.

According to one or more embodiments of the present disclosure, a vehicle control apparatus may include a power control device and a communication control device. The communication control device may be configured to: set, based on a host vehicle satisfying a power-off condition, a sleep state non-entry detection time, wherein the sleep state non-entry detection time is based on a vehicle state of the host vehicle; detect at least one controller, of a plurality of controllers of the host vehicle, that has not entered a sleep state after the sleep state non-entry detection time has elapsed; and transmit, to the power control device, information on the at least one controller. The power control device may be configured to, based on the information on the at least one controller, interrupt power for operation of the at least one controller.

The communication control device may be further configured to: after determining that the host vehicle satisfies the power-off condition, identify the vehicle state of the host vehicle; and store the identified vehicle state of the host vehicle.

The communication control device may be further configured to: after detecting the at least one controller that has not entered the sleep state, identify a second vehicle state of the host vehicle; and store the identified second vehicle state of the host vehicle.

The communication control device may include a vehicle state monitoring device configured to monitor the vehicle state. The vehicle state may include at least one of a window opening/closing state, a door locking state, a trunk opening/closing state, a hood opening/closing state, a gear state, a vehicle speed, or a battery state of charge (SoC). The communication control device may further include: a sleep state non-entry detection timer setting device configured to set the sleep state non-entry detection time based on the vehicle state of the host vehicle; and a power control requesting device configured to transmit the information to the power control device.

The communication control device may be further configured to: monitor the vehicle state of the host vehicle, and set the sleep state non-entry detection time to one of a first time or a second time greater than the first time. The communication control device may be configured to set the sleep state non-entry detection to the first time based on the vehicle state being a first vehicle state. The first vehicle state may include at least one of: no user being present in the host vehicle while a door of the host vehicle is locked, or a battery state of charge (SoC) of the host vehicle being less than or equal to a first value. The communication control device may be configured to set the sleep state non-entry detection to the second time based on the vehicle state being a second vehicle state. The second vehicle state may include at least one of: a user being present in the host vehicle while the door of the host vehicle is unlocked, or the battery SoC of the host vehicle being greater than or equal to a second value. The second value may be greater than the first value.

The communication control device may be further configured to set the sleep state non-entry detection time to a third time greater than the first time and less than the second time, based on the vehicle state not satisfying the first vehicle state and not satisfying the second vehicle state.

The communication control device may be further configured to: monitor a network state of the host vehicle based on a controller area network flexible data rate (CAN FD) protocol. The CAN FD protocol may include at least one of G-CAN FD, P-CAN FD, C-CAN FD, or I-CAN FD. The communication control device may be further configured to detect the at least one controller based on the network state of the host vehicle.

The communication control device may be further configured to monitor a network state of the host vehicle based on a high speed (HS) controller area network (CAN) protocol. The HS CAN protocol may include at least one of M-HS CAN, B-HS CAN, or Ethernet. The communication control device may be further configured to detect the at least one controller based on the network state of the host vehicle.

The plurality of controllers may include at least one of a display device controller, an autonomous driving controller, or an autonomous parking controller. The communication control device may be further configured to: monitor an Ethernet state of the host vehicle for communication of at least one of the display device controller, the autonomous driving controller, or the autonomous parking controller; and detect the at least one controller based on the Ethernet state of the host vehicle.

The communication control device may be configured to: identify, based on detecting the at least one controller, a battery state of charge (SoC) of the host vehicle; and provide, to an external device associated with a user and based on the identified battery SoC being less than a threshold value, information on operating states of the plurality of controllers.

According to one or more embodiments of the present disclosure, a vehicle control method may include: setting, by a communication control device, a sleep state non-entry detection time, based on a host vehicle satisfying a power-off condition; detecting, by the communication control device, at least one controller, of a plurality of controllers of the host vehicle, that has not entered a sleep state after the sleep state non-entry detection time has elapsed; transmitting, by the communication control device, information on the at least one controller to a power control device; and causing interruption of power for operation of the at least one controller based on the information on the at least one controller.

The vehicle control method may further include, after determining that the host vehicle satisfies the power-off condition, identifying, by the communication control device, a vehicle state of the host vehicle.

The vehicle control method may further include: after the detecting the at least one controller that has not entered the sleep state, identifying a vehicle state of the host vehicle; and storing the identified vehicle state of the host vehicle.

The communication control device may include a vehicle state monitoring device configured to monitor a vehicle state. The vehicle state may include at least one of a window opening/closing state, a door locking state, a trunk opening/closing state, a hood opening/closing state, a gear state, a vehicle speed, or a battery state of charge (SoC). The communication control device may further include a sleep state non-entry detection timer setting device configured to set the sleep state non-entry detection time based on the vehicle state of the host vehicle; and a power control requesting device configured to transmit the information to the power control device.

Setting the sleep state non-entry detection time may include: monitoring, by the communication control device, a vehicle state of the host vehicle; setting, by the communication control device, the sleep state non-entry detection time to one of a first time or a second time greater than the first time. Setting the sleep state non-entry detection time may include setting the sleep state non-entry detection time to the first time based on the vehicle state being a first vehicle state. The first vehicle state may include at least one of: no user being present in the host vehicle while a door of the host vehicle is locked, or a battery state of charge (SoC) of the host vehicle being less than or equal to a first value. Setting the sleep state non-entry detection time may include setting the sleep state non-entry detection time to the second time based on the vehicle state being a second vehicle state. The second vehicle state may include at least one of: a user being present in the host vehicle while the door of the host vehicle is unlocked, or the battery SoC of the host vehicle being greater than or equal to a second value. The second value may be greater than the first value.

The vehicle control method may further include: setting, by the communication control device, the sleep state non-entry detection time to a third time greater than the first time and less than the second time based on the vehicle state not satisfying the first vehicle state and not satisfying the second vehicle state.

Detecting the at least one controller may include monitoring, by the communication control device, a network state of the host vehicle based on a controller area network flexible data rate (CAN FD) protocol. The CAN FD protocol may include at least one of G-CAN FD, P-CAN FD, C-CAN FD, I-CAN FD, or Ethernet. Detecting the at least one controller may further include detecting, by the communication control device, the at least one controller based on the network state of the host vehicle.

Detecting the at least one controller may include monitoring, by the communication control device, a network state of the host vehicle based on a high speed (HS) controller area network (CAN) protocol. The HS CAN protocol may include at least one of M-HS CAN, B-HS CAN, or Ethernet. Detecting the at least one controller may further include detecting, by the communication control device, the at least one controller based on the network state of the host vehicle.

The plurality of controllers may include at least one of a display device controller, an autonomous driving controller, or an autonomous parking controller. Detecting the at least one controller may include: monitoring, by the communication control device, an Ethernet state of the host vehicle for communication of at least one of the display device controller, the autonomous driving controller, or the autonomous parking controller; and detecting, by the communication control device, the at least one controller based on the Ethernet state of the host vehicle.

The vehicle control method may further include: identifying, by the communication control device and based on detecting the at least one controller, a battery state of charge (SoC) of the host vehicle; and providing, to an external device associated with a user and based on the identified battery SoC being less than a threshold value, information on operating states of the plurality of controllers.

BRIEF DESCRIPTION OF THE DRAWINGS

The above and other objects, features and advantages of the present disclosure will be more apparent from the following detailed description taken in conjunction with the accompanying drawings.

In the description of the drawings, the same or similar reference numerals may be used for the same or similar components.

DETAILED DESCRIPTION

Figure 1:
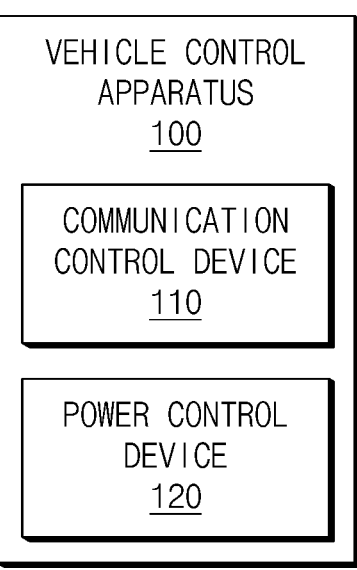
FIG. 1 is a block diagram illustrating components of a vehicle control apparatus.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, one or more embodiments of the present disclosure will be described in detail with reference to FIGS. 1 to 5.

FIG. 1 is a block diagram illustrating components of a vehicle control apparatus 100.

The vehicle control apparatus 100 may include a communication control device 110 and a power control device 120. In FIG. 1, the communication control device 110 and the power control device 120 are shown as separate components, but embodiments of the present disclosure are not limited thereto. For example, the communication control device 110 and the power control device 120 may be implemented as a single device (or module).

The communication control device 110 and the power control device 120 may be operatively connected to each other. The communication control device 110 and the power control device 120 may transmit a variety of data and/or various control signals.

The communication control device 110 may be referred to as a communication device including a communication control unit (CCU).

For example, the communication control device 110 may identify a power state of a host vehicle.

For example, the communication control device 110 may identify whether the host vehicle satisfies a power-off condition. A power-off condition for a vehicle may indicate a condition in which the vehicle may reduce or shut off power on one or more of its components (e.g., controllers), for example, if the vehicle is not in active use or expected not to be in active use for a certain period of time (e.g., when the vehicle is parked in a garage overnight).

The communication control device 110 may set (e.g., determine) a sleep state non-entry detection time of the controller if the host vehicle satisfies a power-off condition.

For example, the communication control device 110 may monitor a vehicle state of the host vehicle which includes at least one of a window opening/closing state, a door locking state, a trunk opening/closing state, a hood opening/closing state, a user's sitting state, a gear state, a vehicle speed, an SoC (State of Charge), or any combination thereof.

For example, the communication control device 110 may set (e.g., determine) the sleep state non-entry detection time to a first time (e.g., 10 minutes) if there is no user in the host vehicle while the doors of the host vehicle are locked or the SoC of the host vehicle is less than or equal to a first value (e.g., a remaining battery level of 50%) For example, if there is a user in the host vehicle while a door of the host vehicle is unlocked, or the SoC of the host vehicle is equal to or greater than a second value (e.g., a remaining battery level of 85%) greater than the first value, the communication control device 110 may set the sleep state non-entry detection time to a second time (e.g., 60 minutes) greater than the first time. In other words, for example, the communication control device 110 may set the sleep state non-entry detection time of the controller to be relatively large under the above-described vehicle state to prevent the power for the operation of the controller from being cut off (e.g., interrupt, reduce, terminate, etc.) against the user's intention.

For example, the communication control device 110 may set the sleep state non-entry detection time to a third time (e.g., 30 minutes) greater than the first time and less than the second time if a vehicle state for setting the sleep state non-entry detection time to the first time or the second time is not detected. In other words, the third time may be a default time for the sleep state non-entry detection time if conditions for the first time and the second time are not met. The communication control device 110 may set a reference value for the sleep state non-entry detection time of the controller to the third time, and may change the sleep state non-entry detection time to the first time or the second time if the vehicle state for setting the sleep state non-entry detection time to the first time or the second time is detected.

The communication control device 110 may detect at least one controller that does not enter a sleep state until the set sleep state non-entry detection time has elapsed from among a plurality of controllers included in the vehicle.

For example, the plurality of controllers may be described in more detail in a description with reference to FIG. 2 to be given later.

For example, the communication control device 110 may monitor the network states of the plurality of controllers (e.g., network states based on CAN protocol and/or network states based on Ethernet communication) in real time, and detect at least one controller that has not entered a sleep state within the set sleep state non-entry detection time based on a monitoring result.

If at least one controller is detected, the communication control device 110 may transfer information on the detected at least one controller to the power control device 120.

For example, the information on the at least one controller may include a control signal requesting to cut off (e.g., interrupt, reduce, terminate, etc.) power for the operation of the at least one controller.

For example, the control signal may include at least one of information on performance of at least one controller, information on a power state of at least one controller, information on an operating state of at least one controller, or any combination thereof.

The power control device 120 may be referred to as a power control device including a power distribution control (PDC)/Integrated Central control Unit (ICU).

For example, the power control device 120 may identify at least one controller which is in a non-sleep state based on the information on the at least one controller received from the communication control device 110, and cut off (e.g., interrupt, reduce, terminate, etc.) power for operation of the at least one controller.

The components included in the vehicle control apparatus 100 shown in FIG. 1 are merely examples, and embodiments of the present disclosure are not limited thereto. The vehicle control apparatus 100 may further include components not shown in FIG. 1. For example, the vehicle control apparatus 100 may further include a display device (e.g., a display). The vehicle control apparatus 100 may visually provide information on the operation of the communication control device 110 and/or the power control device 120 to a user by using the display device.

Figure 2:
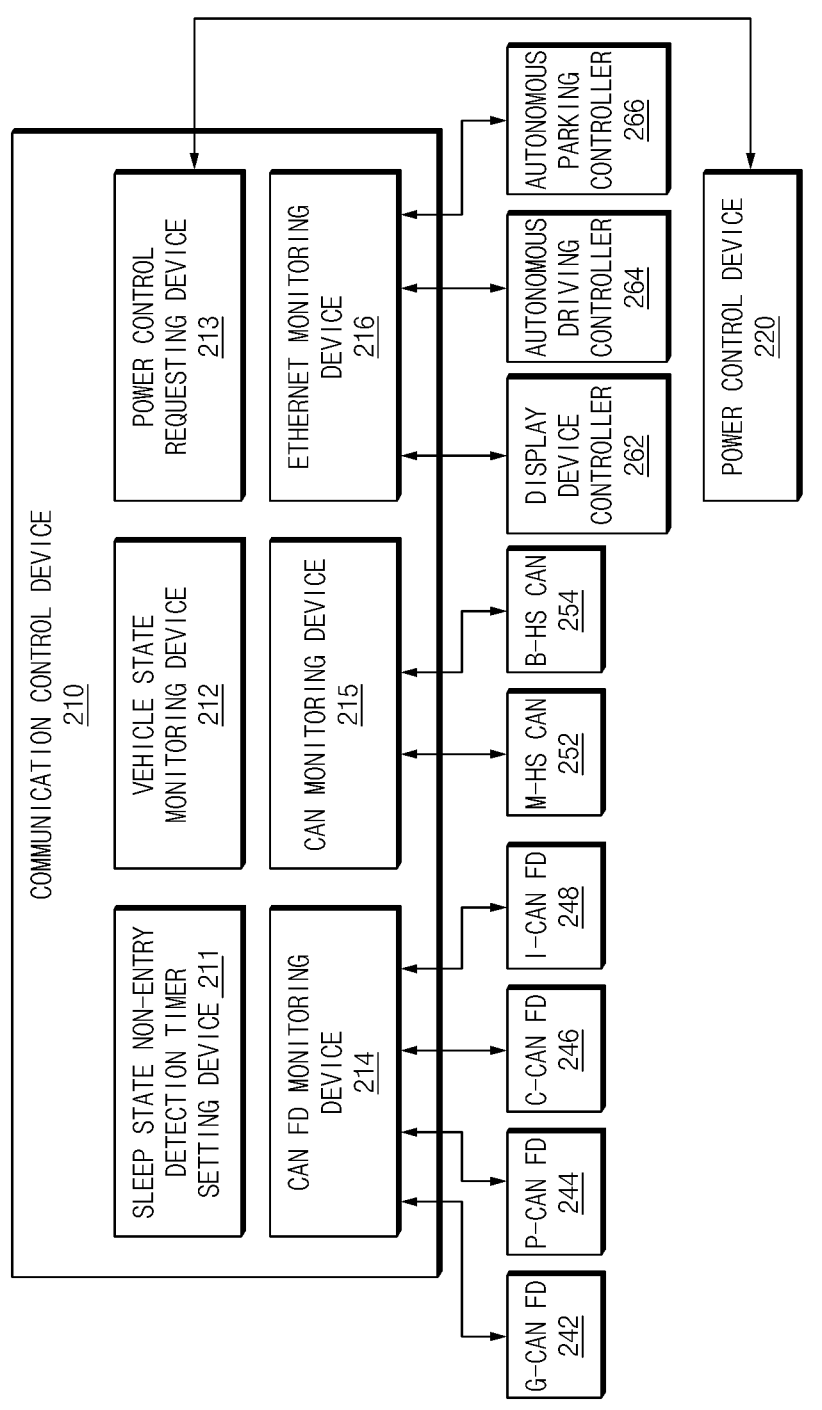
FIG. 2 is a block diagram illustrating the components of the vehicle control apparatus.

FIG. 2 is a block diagram illustrating components of the vehicle control apparatus 100. Various components shown in FIG. 2 may be implemented as separate hardware components, such as multiple instances of a computing system 1000 of FIG. 5. Alternatively, two or more components described in FIG. 2 may be implemented in groups of hardware devices or a single hardware device, such as a computing system 1000 of FIG. 5.

A vehicle control apparatus (e.g., vehicle control apparatus 100 of FIG. 1) may include a communication control device 210 (e.g., the communication control device 110 of FIG. 1) and a power control device 220 (e.g., the power control device 120 of FIG. 1).

The communication control device 210 may include a sleep state non-entry detection timer setting device 211, a vehicle state monitoring device 212, and/or a power control requesting device 213.

For example, the sleep state non-entry detection timer setting device 211 may set a sleep state non-entry detection time.

For example, the sleep state non-entry detection timer setting device 211 may set the sleep state non-entry detection time for a controller based on the vehicle state of a host vehicle obtained through the vehicle state monitoring device 212.

For example, the sleep state non-entry detection timer setting device 211 may set the sleep state non-entry detection time to a first time (e.g., 10 minutes) if there is no user in the host vehicle while the doors of the host vehicle are locked or the SoC of the host vehicle is less than or equal to a first value (e.g., a remaining battery level of 50%)

For example, if there is a user in the host vehicle while a door of the host vehicle is unlocked, or the SoC of the host vehicle is equal to or greater than the first value (e.g., a remaining battery level of 85%), the sleep state non-entry detection timer setting device 211 may set the sleep state non-entry detection time to a second time (e.g., 60 minutes) greater than the first time. In other words, the sleep state non-entry detection timer setting device 211 may set the sleep state non-entry detection time of the controller to be relatively large under the above-described vehicle state condition to prevent the power for the operation of the controller from being cut off (e.g., interrupted, reduced, terminated, etc.) against the user's intention.

For example, the sleep state non-entry detection timer setting device 211 may set the sleep state non-entry detection time to a third time (e.g., 30 minutes) greater than the first time and less than the second time if a vehicle state for setting the sleep state non-entry detection time to the first time or the second time is not monitored. In other words, the sleep state non-entry detection timer setting device 211 may set a reference value for the sleep state non-entry detection time of the controller to the third time, and may change the sleep state non-entry detection time to the first time or the second time if the vehicle state for setting the sleep state non-entry detection time to the first time or the second time is monitored.

For example, the vehicle state monitoring device 212 may monitor at least one of the state of the host vehicle, the state of the user, or any combination thereof at preset periods.

For example, the vehicle state monitoring device 212 may determine whether the host vehicle satisfies a power-off condition. For example, the vehicle state monitoring device 212 may determine whether the host vehicle satisfies a power-off condition based on an operating state of at least one of ACC, IGN1, IGN2, or IGN3 of the host vehicle or any combination thereof.

For example, the vehicle state monitoring device 212 may identify the vehicle state of the host vehicle at the time if it is determined that the host vehicle satisfies the power-off condition, and store the identified vehicle state of the host vehicle.

For example, the vehicle state stored at the time if it is determined that the host vehicle satisfies the power-off condition may include at least one of operating states of a plurality of controllers, a network state for each domain, or any combination thereof at the time if the power-off condition is satisfied. For example, the sleep state non-entry detection timer setting device 211 may update a time period for detecting whether the host vehicle does not enter a sleep state by using at least a part of the stored vehicle state.

For example, the vehicle state monitoring device 212 may identify the state of the host vehicle at the time if at least one controller which has not entered the sleep state is detected, and may store the identified state of the host vehicle.

For example, the vehicle state stored at the time if at least one controller which has not entered the sleep state is detected may include at least one of operating states of a plurality of controllers at the time if at least one controller which has not entered the sleep state is detected, a network state for each domain, or any combination thereof.

For example, the vehicle state stored at the time if at least one controller which has not entered the sleep state is detected may be obtained through a configuration not shown in FIG. 2 (e.g., a diagnostic device). The vehicle state monitoring device 212 may identify at least one of a frequency of each vehicle state, a user condition, or any combination thereof, based on the obtained and/or identified vehicle state. For example, the sleep state non-entry detection timer setting device 211 may update a sleep state non-entry detection time for detecting whether the host vehicle has not entered a sleep state by using at least a part of the stored vehicle state.

For example, the vehicle state monitoring device 212 may monitor a vehicle state including at least one of a window opening/closing state, a door locking state, a trunk opening/closing state, a hood opening/closing state, a gear state, a vehicle speed, an SoC (State of Charge), or any combination thereof.

For example, the vehicle state monitoring device 212 may monitor a vehicle state including at least one of the presence or absence of a user in the host vehicle, a user's sitting state, or any combination thereof.

For example, the vehicle state monitoring device 212 may transmit a monitoring result to the sleep state non-entry detection timer setting device 211. For example, the sleep state non-entry detection timer setting device 211 may set a sleep state non-entry detection time for detecting whether the controller has not entered a sleep state based on the received monitoring result.

For example, if it is determined that at least one controller has not entered the sleep state within the sleep state non-entry detection time, the vehicle state monitoring device 212 may identify an SoC of the host vehicle and provide a notification to a user.

For example, the vehicle state monitoring device 212 may identify the SoC of the host vehicle if at least one controller is determined to be not in a sleep state.

For example, if the identified SoC is less than a threshold value (e.g., 45%), the vehicle state monitoring device 212 may provide information on operating states of a plurality of controllers to an external device (e.g., a user terminal) associated with a user. For example, the information on the operating states of the plurality of controllers may include identification information of at least one controller which is in a non-sleep state.

For example, the power control requesting device 213 may transmit information on the controller to the power control device 220.

For example, the power control requesting device 213 may transmit information on at least one of the plurality of controllers to the power control device 220.

For example, the power control requesting device 213 may transmit information on at least one controller, which has not entered the sleep state until the sleep state non-entry detection time has elapsed, to the power control device 220.

For example, the power control requesting device 213 may transmit a control signal requesting to cut off (e.g., interrupt, reduce, terminate, etc.) power for the operation of at least one controller to the power control device 220. For example, the control signal may include at least one of information on performance of at least one controller, information on a power state of at least one controller, information on an operating state of at least one controller, or any combination thereof.

The communication control device 210 may include at least one monitoring device for monitoring the network state of a host vehicle. For example, the communication control device 210 may be referred to as a communication device including a communication control unit (CCU).

For example, the communication control device 210 may include at least one monitoring device that monitors a plurality of controllers (e.g., G-CAN (Controller Area Network) FD (Flexible Data rate) 242, P-CAN FD 244, C-CAN FD 246, I-CAN FD 248, M-HS CAN 252, B-HS CAN 254, a display device controller 262, an autonomous driving controller 264, and/or an autonomous parking controller 266) provided for communication between components included in the host vehicle. For example, the classification of the aforementioned CANs may be a physical classification based on at least one of communication speed, control object, can transceiver type, or any combination thereof. For example, B-CAN may be used to control at least one of a smart key module, a BCM (Body Control Module), a power window, or any combination thereof. For example, C-CAN can be a vehicle's cluster, YRS(Yaw Rate Sensor) engine, transmission, ABS(Anti-lock Braking System), ECU (Engine Control Unit), TCU (Transmission Control Unit), or any combination thereof. It can be used to control at least one of them. For example, a communication speed based on C-CAN may be faster than a communication speed based on B-CAN.

For example, a CAN FD monitoring device 214 may identify whether at least one controller among the plurality of controllers of the host vehicle has entered a sleep state by monitoring at least one of the G-CAN FD 242, the P-CAN FD 244, the C-CAN FD 246, the I-CAN FD 248, or any combination thereof.

For example, a CAN monitoring device 215 may identify whether at least one controller among the plurality of controllers of the host vehicle has entered a sleep state by monitoring at least one of the M-HS (High Speed) CAN 252, the B-HS CAN 254, or any combination thereof.

For example, an Ethernet monitoring device 216 may identify whether at least one controller among the plurality of controllers of the host vehicle has entered a sleep state by monitoring at least one of the display device controller 262, the autonomous driving controller 264, and/or the autonomous parking controller 266, or any combination thereof.

The power control device 220 may transmit and receive a variety of data and/or various control signals to and from the communication control device 210. For example, the power control device 220 may be referred to as a power control device including a power distribution control (PDC)/integrated central control unit (ICU).

For example, the power control device 220 may receive a control signal from the power control requesting device 213 included in the communication control device 210.

As an example, the control signal may include a signal requesting to cut off (e.g., interrupt, reduce, terminate, etc.) power for the operation of at least one controller among the plurality of controllers. For example, the control signal may include at least one of information on performance of at least one controller, information on a power state of at least one controller, information on an operating state of at least one controller, or any combination thereof.

For example, the power control device 220 may identify at least one controller among the plurality of controllers based on the received control signal, and cut off (e.g., interrupt, reduce, terminate, etc.) power supplied to the at least one controller. Accordingly, the power control device 220 may allow the at least one controller to enter a sleep state.

In the above-described embodiments, the description for numerical values is merely one example, and embodiments of the present disclosure are not limited thereto.

For example, the description of one numerical value for the first time (e.g., 10 minutes), the second time (60 minutes), the third time (30 minutes), the first value (50%), the second value (85%), the threshold value (45%), or any combination thereof is merely one example, and embodiments of the present disclosure should not be construed as being limited to the above-described numerical values.

For example, the first time, the second time, and the third time related to the sleep state non-entry detection time, and the first value, the second value, and the threshold value related to the remaining battery level may include a variable setting value based on at least one of a setting by the user, a real-time vehicle state of the host vehicle, an external environment state of the host vehicle, or any combination thereof.

Figure 3:
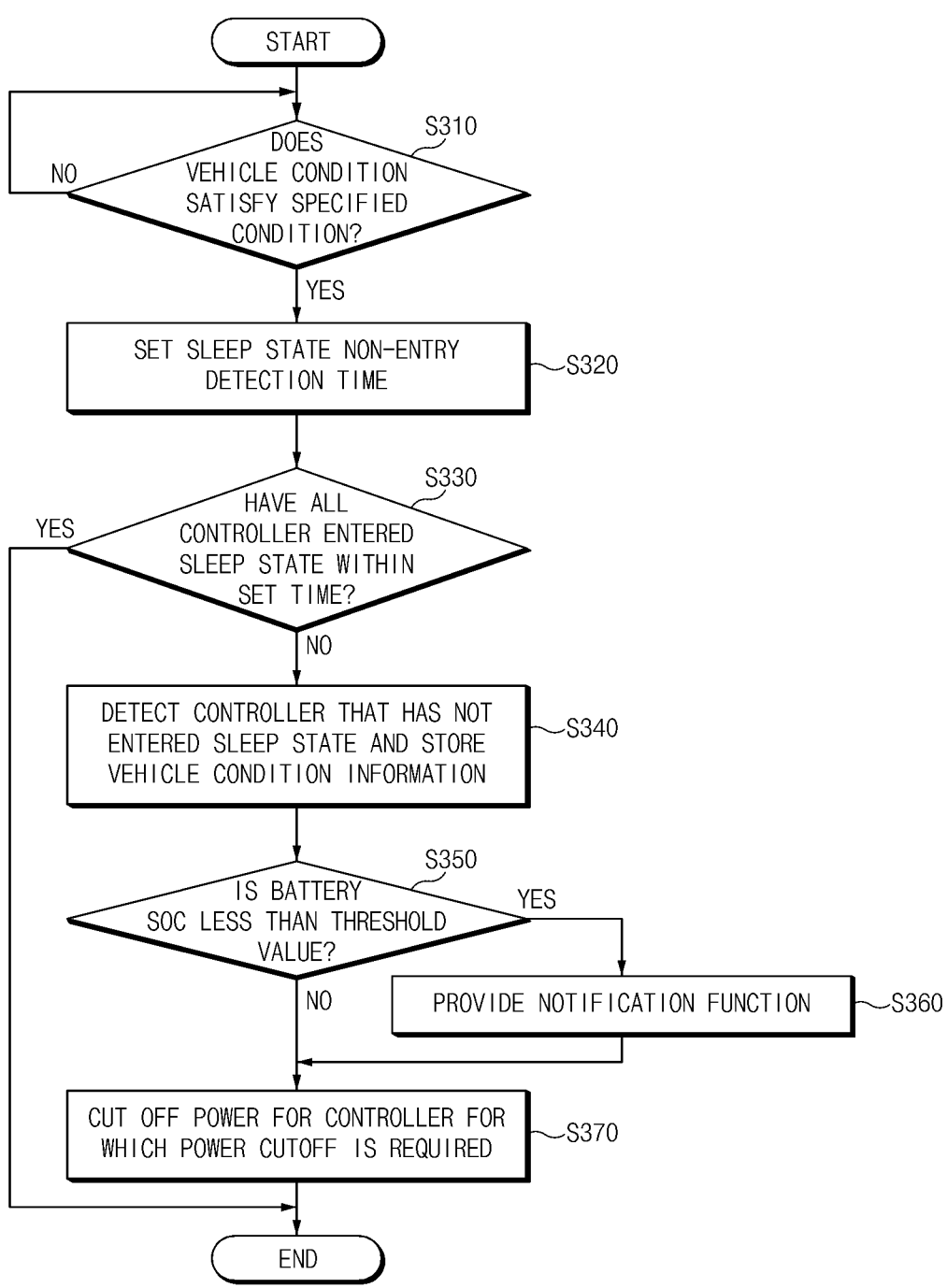
FIG. 3 is a flowchart of an operation of a vehicle control apparatus.

FIG. 3 is a flowchart of operation of a vehicle control apparatus.

A vehicle control apparatus (e.g., the vehicle control apparatus 100 of FIG. 1) may perform the operations described in FIG. 3. For example, at least some of the components included in the vehicle control apparatus (e.g., the communication control device 110 and the power control device 120 in FIG. 1) may be configured to perform the operations of FIG. 3.

Operations of S310 to S370 may be performed sequentially, but are not necessarily performed sequentially. For example, the order of operations may be changed, or at least two operations may be performed in parallel. In addition, contents corresponding to or overlapping the above description with respect to FIG. 3 may be briefly described or omitted.

The vehicle control apparatus may determine whether the vehicle state satisfies a specified condition (S310).

For example, the vehicle control apparatus may determine whether the vehicle state of the host vehicle satisfies a power-off condition.

For example, the vehicle control apparatus may determine whether the host vehicle satisfies a power-off condition based on states of components (e.g., ACC, IGN1, IGN2, IGN3, or any combination thereof) of the host vehicle.

For example, if the vehicle state satisfies a specified condition (e.g., if the host vehicle is identified as being in a power-off state) (e.g., S310—Yes), the vehicle control apparatus may perform S320.

For example, if the vehicle state does not satisfy a specified condition (e.g., if the host vehicle is identified as not being in a power-off state) (e.g., S310—No), the vehicle control apparatus may repeatedly perform S310.

The vehicle control apparatus may set a sleep state non-entry detection time (S320).

For example, the vehicle control apparatus may continuously monitor a vehicle state at preset periods and set a sleep state non-entry detection time based on at least a part of a monitoring result.

For example, the vehicle state for setting the sleep state non-entry detection time may include at least one of a window opening/closing state, a door locking state, a trunk opening/closing state, a hood opening/closing state, a user's sitting state, a gear state, a vehicle speed, an SoC (State of Charge), or any combination thereof.

The vehicle control apparatus may determine whether all controllers have entered a sleep state within a set time (S330).

For example, the vehicle control apparatus may determine whether all of the plurality of controllers included in the host vehicle has entered the sleep state within the sleep state non-entry detection time set in S320.

For example, the plurality of controllers may include at least one of the G-CAN (Controller Area Network) the FD (Flexible Data rate) 242, the P-CAN FD 244, the C-CAN FD 246, the I-CAN FD 248, the M-HS CAN 252, the B-HS CAN 254, the display device controller 262, the autonomous driving controller 264, the autonomous parking controller 266, or a combination thereof.

For example, if all controllers have entered a sleep state within a set time (e.g., S330—Yes), the vehicle control apparatus may end the operation.

For example, if not all controllers have entered the sleep state within the set time (e.g., when it is identified that at least one controller has not entered the sleep state) (e.g., S330—No), the vehicle control apparatus may perform S340.

The vehicle control apparatus may detect a controller which has not entered the sleep state and store vehicle state information (S340).

For example, the vehicle control apparatus may detect at least one controller that has not entered the sleep state within the set sleep state non-entry detection time and obtain identification information of the at least one controller.

For example, the vehicle control apparatus may monitor a vehicle state at the time if the at least one controller which has not entered a sleep state is detected, in real time, and store the monitored vehicle state information. For example, the vehicle control apparatus may use the stored vehicle state information to set a sleep state non-entry detection time.

The vehicle control apparatus may determine whether a state of charge (SoC) of a battery is less than a threshold value (S350).

For example, if the SoC of the battery is less than the threshold value (e.g., S350—Yes), the vehicle control apparatus may perform S360.

For example, if the SoC of the battery is greater than or equal to the threshold value (e.g., S350—No), the vehicle control apparatus may perform S370.

The vehicle control apparatus may provide a notification function (step S360).

For example, the vehicle control apparatus may provide information on operating states of a plurality of controllers to an external device associated with a user (e.g., a user terminal) as it is identified that the SoC of the battery is less than the threshold value. For example, the information on the operating states of the plurality of controllers may include identification information of at least one controller which is in a non-sleep state.

The vehicle control apparatus may cut off (e.g., interrupt, reduce, terminate, etc.) power for a controller for which it is needed to cut off the power (S370).

For example, the vehicle control apparatus may identify at least one controller that has not entered the sleep state within the sleep state non-entry detection time and cut off power for the operation of the identified at least one controller.

For example, the vehicle control apparatus may identify at least one controller in real time through the communication control device and transmit information on the identified at least one controller to the power control device.

For example, the power control device may cut off power for operation of the at least one controller based on the received information.

Figure 4:
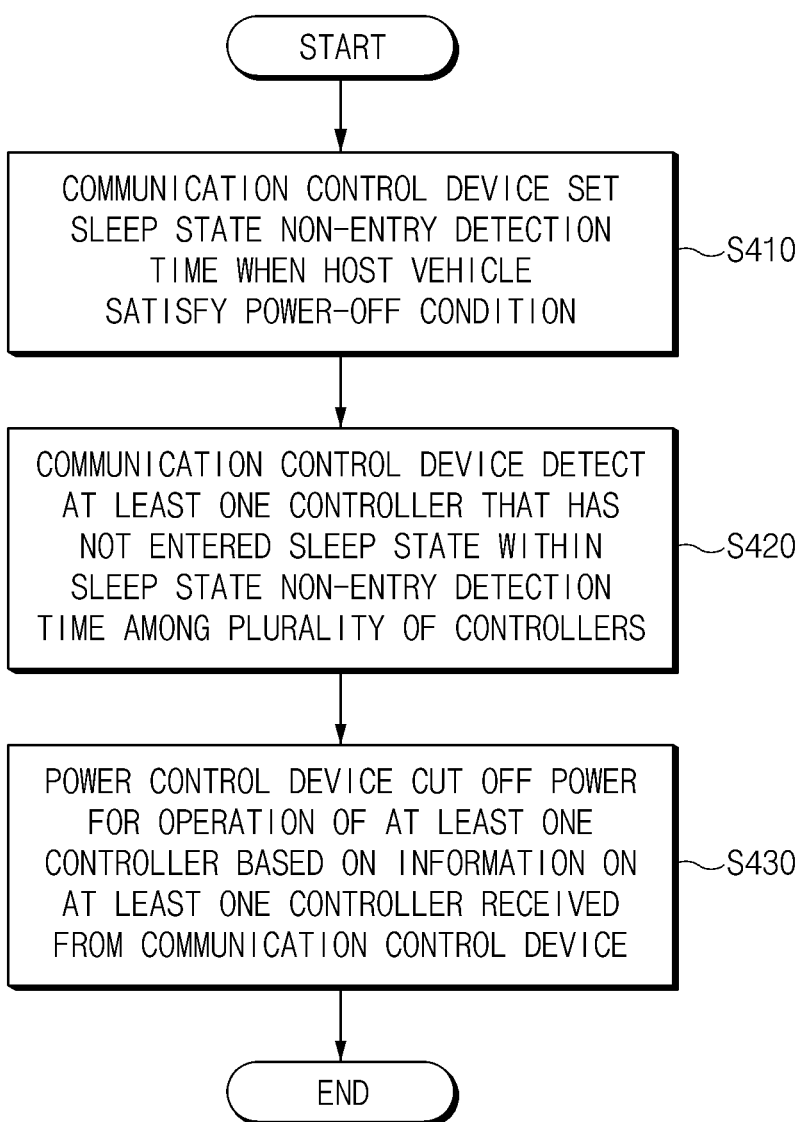
FIG. 4 is a flowchart of an operation of a vehicle control apparatus.

FIG. 4 is a flowchart of operation of a vehicle control apparatus.

A vehicle control apparatus (e.g., the vehicle control apparatus 100 of FIG. 1) may perform the operations described in FIG. 4. For example, at least some of the components included in the vehicle control apparatus (e.g., the communication control device 110 and the power control device 120 in FIG. 1) may be configured to perform the operations of FIG. 4.

Operations of S410 to S430 may be performed sequentially, but are not necessarily performed sequentially. For example, the order of operations may be changed, or at least two operations may be performed in parallel. In addition, contents corresponding to or overlapping the above description with respect to FIG. 4 may be briefly described or omitted.

The communication control device may set a sleep state non-entry detection time if the host vehicle satisfies a power-off condition (S410).

For example, the communication control device may determine whether the host vehicle satisfies a power-off condition based on an operating state of at least one of ACC, IGN1, IGN2, or IGN3 of the host vehicle or any combination thereof.

For example, the communication control device may monitor a vehicle state of the host vehicle and set a sleep state non-entry detection time for a controller based on the monitored vehicle state.

For example, the communication control device may set the sleep state non-entry detection time to a first time (e.g., 10 minutes) if there is no user in the host vehicle while the doors of the host vehicle are locked or the SoC of the host vehicle is less than or equal to a first value (e.g., a remaining battery level of 50%)

For example, if there is a user in the host vehicle while a door of the host vehicle is unlocked, or the SoC of the host vehicle is equal to or greater than the first value (e.g., a remaining battery level of 85%), the communication control device may set the sleep state non-entry detection time to a second time (e.g., 60 minutes) greater than the first time. In other words, for example, the communication control device may set the sleep state non-entry detection time of the controller to be relatively large under the above-described vehicle state condition to prevent the power for the operation of the controller from being cut off (e.g., interrupted, reduced, terminated, etc.) against the user's intention.

For example, the communication control device may set the sleep state non-entry detection time to a third time (e.g., 30 minutes) greater than the first time and less than the second time if a vehicle state for setting the sleep state non-entry detection time to the first time or the second time is not monitored. In other words, the communication control device may set a reference value for the sleep state non-entry detection time of the controller to the third time, and may change the sleep state non-entry detection time to the first time or the second time if the vehicle state for setting the sleep state non-entry detection time to the first time or the second time is monitored.

The communication control device 110 may detect at least one controller that has not entered a sleep state until the sleep state non-entry detection time has elapsed, from among a plurality of controllers (S420).

For example, the plurality of controllers may include at least one of the G-CAN (Controller Area Network) FD (Flexible Data rate) 242, the P-CAN FD 244, the C-CAN FD 246, the I-CAN FD 248, the M-HS CAN 252, the B-HS CAN 254, a display device controller 262, an autonomous driving controller 264, an autonomous parking controller 266, or a combination thereof.

For example, the communication control device may transmit information on the detected at least one controller to the power control device. For example, the communication control device may transmit a control signal requesting to cut off (e.g., interrupt, reduce, terminate, etc.) power for the operation of at least one controller to the power control device.

For example, the control signal may include at least one of information on performance of at least one controller, information on a power state of at least one controller, information on an operating state of at least one controller, or any combination thereof.

The power control device may cut off power for the operation of at least one controller based on the information on the at least one controller received from the communication control device (S430).

Figure 5:
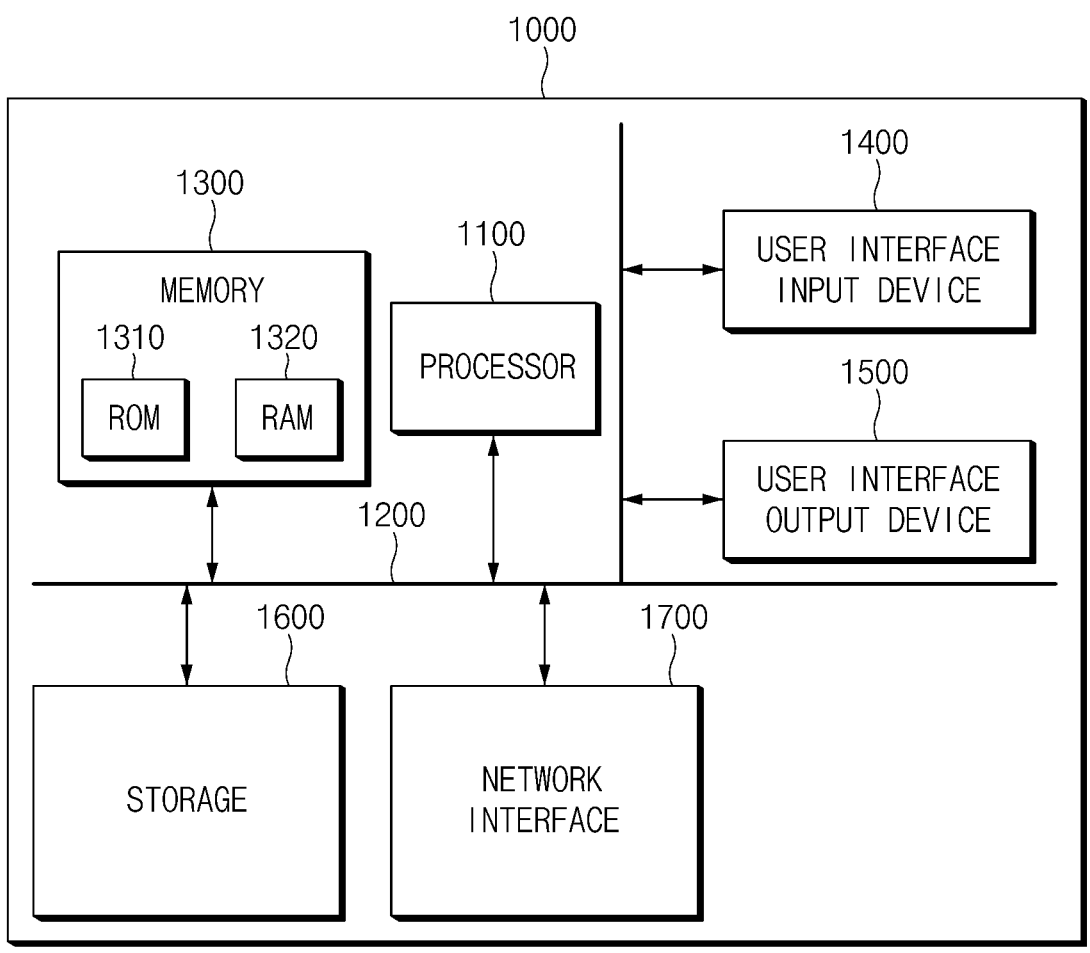
FIG. 5 illustrates a computing system for a vehicle control method.

FIG. 5 illustrates a computing system for a vehicle control method.

Referring to FIG. 5, a computing system 1000 for a vehicle control method may include at least one processor 1100, a memory 1300, a user interface input device 1400, a user interface output device 1500, storage 1600, and a network interface 1700, which are connected with each other via a bus 1200. Any of the components, the modules, and the devices described herein (e.g., a vehicle control apparatus 100, a communication control device 110, a power control device 120, a communication control device 210, a sleep state non-entry detection timer setting device 211, a vehicle state monitoring device 212, a power control requesting device 213, a CAN FD monitoring device 214, a CAN monitoring device 215, an Ethernet monitoring device 216, a display device controller 262, an autonomous driving controller 264, an autonomous parking controller 266, a power control device 220, etc.) may be implemented with one or more instances of the computing system 1000.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, one or more embodiments disclosed in the present disclosure are not intended to limit the technical idea of the present disclosure but to describe the present disclosure, and the scope of the technical idea of the present disclosure is not limited by the embodiments. The scope of protection of the present disclosure should be interpreted by the following claims, and all technical ideas within the scope equivalent thereto should be construed as being included in the scope of the present disclosure.

The effects of the vehicle control apparatus and the method therefor according to the present disclosure are given as follows.

According to one or more embodiments of the present disclosure, it is possible to use power efficiently by monitoring the overall network state of the vehicle after the engine of the vehicle is turned off and adaptively controlling power based on a monitoring result.

In addition, according to one or more embodiments of the present disclosure, it is possible to perform a sleep non-entry detection monitoring operation based on a vehicle state or a user state rather than a fixed time zone and set optimal conditions for a situation in which power cutoff is required to cut off power to a controller power.

In addition, according to one or more embodiments of the present disclosure, it is possible to prevent a battery discharge problem occurring in the development and production stages of a vehicle, and enable a user to stably use vehicle power.

In addition, according to one or more embodiments of the present disclosure, it is possible to quickly and accurately prevent a battery discharge problem by detecting whether a controller has entered a sleep state for each domain (e.g., CAN, CAN FD, Ethernet).

In addition, various effects may be provided that are directly or indirectly understood through the disclosure.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus comprising:
a power control device; and
a communication control device configured to:
    set, based on a host vehicle satisfying a power-off condition, a sleep state non-entry detection time;
    detect at least one controller, of a plurality of controllers of the host vehicle, that has not entered a sleep state after the sleep state non-entry detection time has elapsed; and
    transmit, to the power control device, information on the detected at least one controller,
wherein the power control device is configured to, based on the information on the detected at least one controller, interrupt power for operation of the detected at least one controller, and
wherein the sleep state non-entry detection time is set to one of a plurality of different times based on a vehicle state of the host vehicle.

2. The vehicle control apparatus of claim 1, wherein the communication control device is further configured to:
after determining that the host vehicle satisfies the power-off condition, identify the vehicle state of the host vehicle; and
store the identified vehicle state of the host vehicle.

3. The vehicle control apparatus of claim 1, wherein the communication control device is further configured to:
after detecting the at least one controller that has not entered the sleep state, identify a second vehicle state of the host vehicle; and
store the identified second vehicle state of the host vehicle.

4. The vehicle control apparatus of claim 1, wherein the communication control device comprises:

a vehicle state monitoring device configured to monitor the vehicle state, wherein the vehicle state comprises at least one of a window opening/closing state, a door locking state, a trunk opening/closing state, a hood opening/closing state, a gear state, a vehicle speed, or a battery state of charge (SoC);
a sleep state non-entry detection timer setting device configured to set the sleep state non-entry detection time based on the vehicle state of the host vehicle; and
a power control requesting device configured to transmit the information to the power control device.

5. The vehicle control apparatus of claim 1, wherein the communication control device is further configured to:
monitor the vehicle state of the host vehicle, and
set the sleep state non-entry detection time to one of:
    a first time, based on the vehicle state being a first vehicle state, wherein the first vehicle state comprises at least one of:
        no user being present in the host vehicle while a door of the host vehicle is locked, or
        a battery state of charge (SoC) of the host vehicle being less than or equal to a first value, or
    a second time greater than the first time, based on the vehicle state being a second vehicle state, wherein the second vehicle state comprises at least one of:
        a user being present in the host vehicle while the door of the host vehicle is unlocked, or
        the battery SoC of the host vehicle being greater than or equal to a second value, wherein the second value is greater than the first value.

6. The vehicle control apparatus of claim 5, wherein based on the vehicle state not being the first vehicle state or the second vehicle state, the communication control device is further configured to set the sleep state non-entry detection time to a third time, and wherein the third time is greater than the first time and less than the second time.

7. The vehicle control apparatus of claim 1, wherein the communication control device is further configured to:
monitor a state of the plurality of controllers of the host vehicle based on a controller area network flexible data rate (CAN FD) protocol.

8. The vehicle control apparatus of claim 1, wherein the communication control device is further configured to:
monitor a state of the plurality of controllers of the host vehicle based on a high speed (HS) controller area network (CAN) protocol.

9. The vehicle control apparatus of claim 1, wherein the plurality of controllers comprise at least one of a display device controller, an autonomous driving controller, or an autonomous parking controller, and
wherein the communication control device is further configured to:
    monitor a state of the plurality of controllers of the host vehicle based on an Ethernet.

10. The vehicle control apparatus of claim 1, wherein the communication control device is configured to:
identify, based on detecting the at least one controller, a battery state of charge (SoC) of the host vehicle; and
provide, to an external device associated with a user and based on the identified battery SoC being less than a threshold value, information on operating states of the plurality of controllers.

11. A vehicle control method comprising:
setting, by a communication control device, a sleep state non-entry detection time, based on a host vehicle satisfying a power-off condition;

detecting, by the communication control device, at least one controller, of a plurality of controllers of the host vehicle, that has not entered a sleep state after the sleep state non-entry detection time has elapsed;

transmitting, by the communication control device, information on the detected at least one controller to a power control device; and causing interruption of power for operation of the detected at least one controller based on the information on the detected at least one controller, wherein the sleep state non-entry detection time is set to one of a plurality of different times based on a vehicle state of the host vehicle.

12. The vehicle control method of claim 11, further comprising:

after determining that the host vehicle satisfies the power-off condition, identifying, by the communication control device, the vehicle state of the host vehicle.

13. The vehicle control method of claim 11, further comprising:

after the detecting the at least one controller that has not entered the sleep state, identifying a second vehicle state of the host vehicle; and storing the identified second vehicle state of the host vehicle.

14. The vehicle control method of claim 11, wherein the communication control device comprises:

a vehicle state monitoring device configured to monitor the vehicle state, wherein the vehicle state comprises at least one of a window opening/closing state, a door locking state, a trunk opening/closing state, a hood opening/closing state, a gear state, a vehicle speed, or a battery state of charge (SoC);

a sleep state non-entry detection timer setting device configured to set the sleep state non-entry detection time based on the vehicle state of the host vehicle; and a power control requesting device configured to transmit the information to the power control device.

15. The vehicle control method of claim 11, wherein the setting the sleep state non-entry detection time comprises:

monitoring, by the communication control device, the vehicle state of the host vehicle; and setting, by the communication control device, the sleep state non-entry detection time to one of:

a first time, based on the vehicle state being a first vehicle state, wherein the first vehicle state comprises at least one of:

no user being present in the host vehicle while a door of the host vehicle is locked, or a battery state of charge (SoC) of the host vehicle being less than or equal to a first value, or a second time greater than the first time, based on the vehicle state being a second vehicle state, wherein the second vehicle state comprises at least one of:

a user being present in the host vehicle while the door of the host vehicle is unlocked, or the battery SoC of the host vehicle being greater than or equal to a second value, wherein the second value is greater than the first value.

16. The vehicle control method of claim 15, further comprising:

based on the vehicle state not being the first vehicle state or the second vehicle state, setting, by the communication control device, the sleep state non-entry detection time to a third time, and wherein the third time is greater than the first time and less than the second time.

17. The vehicle control method of claim 11, wherein the detecting the at least one controller comprises:

monitoring, by the communication control device, a state of the plurality of controllers of the host vehicle based on a controller area network flexible data rate (CAN FD) protocol.

18. The vehicle control method of claim 11, wherein the detecting the at least one controller comprises:

monitoring, by the communication control device, a state of the plurality of controllers of the host vehicle based on a high speed (HS) controller area network (CAN) protocol.

19. The vehicle control method of claim 11, wherein the plurality of controllers comprise at least one of a display device controller, an autonomous driving controller, or an autonomous parking controller, and wherein the detecting the at least one controller comprises:

monitoring, by the communication control device, a state of the plurality of controllers of the host vehicle based on an Ethernet.

20. The vehicle control method of claim 11, further comprising:

identifying, by the communication control device and based on detecting the at least one controller, a battery state of charge (SoC) of the host vehicle; and providing, to an external device associated with a user and based on the identified battery SoC being less than a threshold value, information on operating states of the plurality of controllers.

* * * * *